(12) United States Patent
Fujita et al.

(10) Patent No.: US 12,018,640 B2
(45) Date of Patent: Jun. 25, 2024

(54) WINDMILL BLADE, WINDMILL, AND METHOD OF MANUFACTURING WINDMILL BLADE

(71) Applicant: MITSUBISHI HEAVY INDUSTRIES, LTD., Tokyo (JP)

(72) Inventors: Takeshi Fujita, Tokyo (JP); Keisuke Ota, Tokyo (JP); Kentaro Shindo, Tokyo (JP); Hiroaki Takeuchi, Tokyo (JP); Toshiyuki Hirano, Tokyo (JP); Atsushi Yuge, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 102 days.

(21) Appl. No.: 17/313,233

(22) Filed: May 6, 2021

(65) Prior Publication Data

US 2021/0363963 A1 Nov. 25, 2021

(30) Foreign Application Priority Data

May 22, 2020 (JP) ................. 2020-089895

(51) Int. Cl.
*F03D 1/06* (2006.01)
*F03D 80/30* (2016.01)

(52) U.S. Cl.
CPC ........... *F03D 1/0675* (2013.01); *F03D 80/30* (2016.05); *F05B 2240/221* (2013.01); *F05B 2240/301* (2013.01); *F05B 2240/303* (2020.08); *F05B 2280/6003* (2013.01)

(58) Field of Classification Search
CPC ...... F03D 1/0675; F03D 1/0683; F03D 80/30; F03D 80/40; F05B 2240/301; F05B 2240/303; F05B 2240/221; F05B 2280/6003

See application file for complete search history.

(56) References Cited

U.S. PATENT DOCUMENTS

| 4,895,491 | A | 1/1990 | Cross et al. | |
|---|---|---|---|---|
| 6,338,455 | B1 * | 1/2002 | Rauch | H05B 3/16 |
| | | | | 244/134 R |
| 9,482,208 | B2 * | 11/2016 | Loewe | F03D 80/40 |

(Continued)

FOREIGN PATENT DOCUMENTS

| CN | 202749789 | 2/2013 |
|---|---|---|
| CN | 105673361 | 6/2016 |

(Continued)

OTHER PUBLICATIONS

Extended European Search Report dated Oct. 15, 2021, in European Patent Application No. 21172419.0.
Office Action dated Sep. 17, 2021 in corresponding TW Application No. 110117280.
Office Action dated Aug. 15, 2023 in corresponding Japanese Patent Application No. 2020-089895, with Machine Translation, 14 pages.

*Primary Examiner* — Sang K Kim
(74) *Attorney, Agent, or Firm* — Wenderoth, Lind & Ponack, L.L.P.

(57) ABSTRACT

A windmill blade includes a blade main body and a leading edge protector. The leading edge protector includes a conductive plate covering a leading edge, and a conductive mesh member connected to the conductive plate along a blade chord direction of the windmill blade. The conductive mesh member is provided with a plurality of holes. A skin or an adhesive at least partially enters the plurality of holes, so that the leading edge protector is fixed to the skin.

14 Claims, 16 Drawing Sheets

(56) References Cited

U.S. PATENT DOCUMENTS

| | | | |
|---|---|---|---|
| 10,844,843 B2 * | 11/2020 | Fujioka | F03D 9/25 |
| 10,907,618 B2 * | 2/2021 | Kirkegaard | B29C 66/1122 |
| 11,480,157 B2 * | 10/2022 | Lindskog | F03D 80/40 |
| 11,519,390 B2 * | 12/2022 | Murata | F03D 80/30 |
| 2007/0036659 A1 | 2/2007 | Hibbard | |
| 2007/0210073 A1 * | 9/2007 | Hubert | H05B 3/262 |
| | | | 219/535 |
| 2011/0182731 A1 | 7/2011 | Naka et al. | |
| 2013/0170992 A1 * | 7/2013 | Loewe | F03D 1/0675 |
| | | | 29/611 |
| 2016/0348643 A1 | 12/2016 | Fujioka et al. | |
| 2019/0193862 A1 | 6/2019 | Kinlen et al. | |
| 2020/0141382 A1 | 5/2020 | Koops Kratmann et al. | |

FOREIGN PATENT DOCUMENTS

| | | |
|---|---|---|
| CN | 206889186 | 1/2018 |
| CN | 108843523 | 11/2018 |
| CN | 110691906 | 1/2020 |
| JP | 2006-521485 | 9/2006 |
| JP | 2016-223325 | 12/2016 |
| JP | 2017-078187 | 4/2017 |
| JP | 2019-112051 | 7/2019 |
| WO | 2013/007267 | 1/2013 |
| WO | 2018/157929 | 9/2018 |
| WO | 2018/219524 | 12/2018 |

* cited by examiner

WINDMILL BLADE, WINDMILL, AND METHOD OF MANUFACTURING WINDMILL BLADE

CROSS-REFERENCE TO RELATED APPLICATIONS

This application claims the benefit of priority to Japanese Patent Application Number 2020-089895 filed on May 22, 2020. The entire contents of the above-identified application are hereby incorporated by reference.

TECHNICAL FIELD

The present disclosure relates to a windmill blade, a windmill, and a method of manufacturing the windmill blade.

RELATED ART

For example, in a windmill used in a wind power generation device or the like, erosion damage occurs due to repeated collision of raindrops, dust, or the like with a leading edge of a rotating windmill blade. In recent years, the peripheral speed of a blade tip of a windmill blade has increased with an increase in the size of the windmill, and the influence of erosion damage on the service life of the windmill has increased.

In order to suppress such erosion damage, a leading edge protector (LEP) may be disposed at a leading edge of a windmill blade where erosion damage is likely to occur. For example, WO 2018/219524 discloses a technique of suppressing erosion damage by covering a leading edge of a windmill blade with a shield member on a blade tip side where the peripheral speed of the windmill blade increases.

SUMMARY

Windmill blades are required to have lightning resistance performance because a windmill is located at a high elevation during operation and can be struck by lightning. To improve the lightning resistance performance of a windmill blade, for example, it is conceivable to form the above-described leading edge protector from a conductive material such as metal, which is provided at the windmill blade to suppress erosion damage. In this case, there is a need to attach the leading edge protector made of the conductive material to a skin of a blade main body made of a different material such as reinforced fiber plastic. Because it is difficult to ensure strength of the connection between members containing different materials, the strength of attachment of the leading edge protector to the skin may decrease, causing the leading edge protector to fall off or the like. Conventionally, the leading edge protector has been attached to the skin using an adhesive. However, when the adhesive contains moisture such as raindrops, the adhesive strength of the adhesive tends to decline, making it more difficult to achieve attachment strength of the leading edge protector.

At least one aspect of the present disclosure has been made in view of the above circumstances, and an object of the present disclosure is to provide a windmill blade, a windmill, and a method of manufacturing the windmill blade, which are capable of achieving both good lightning resistance performance and erosion resistance performance.

To solve the above-mentioned problems, a windmill blade according to at least one aspect of the present disclosure includes:

a blade main body; and
a leading edge protector including a conductive plate and a conductive mesh member, the conductive plate covering a leading edge of the blade main body, the conductive mesh member being connected to the conductive plate along a blade chord direction of the windmill blade and including a plurality of holes open in a thickness direction of a skin constituting the blade main body, wherein
the skin or an adhesive used for bonding the leading edge protector to the skin at least partially enters the plurality of holes, so that the leading edge protector is fixed to the skin.

To solve the above-described problems, a windmill according to at least one aspect of the present disclosure includes the windmill blade described in at least one aspect of the present disclosure.

To solve the above-described problems, a method of manufacturing a windmill blade according to at least one aspect of the present disclosure includes:

preparing a leading edge protector including a conductive plate and a conductive mesh member, the conductive plate being shaped to conform to a leading edge of a blade main body, the conductive mesh member being connected to an end of the conductive plate and including a plurality of holes; and
fixing the leading edge protector to the blade main body so that a skin constituting the blade main body or an adhesive for bonding the leading edge protector to the skin at least partially enters the plurality of holes.

At least one aspect of the present disclosure can provide a windmill blade, a windmill, and a method of manufacturing the windmill blade, which are capable of achieving both good lightning resistance performance and erosion resistance performance.

BRIEF DESCRIPTION OF DRAWINGS

The disclosure will be described with reference to the accompanying drawings, wherein like numbers reference like elements.

DESCRIPTION OF EMBODIMENTS

Figure 1:
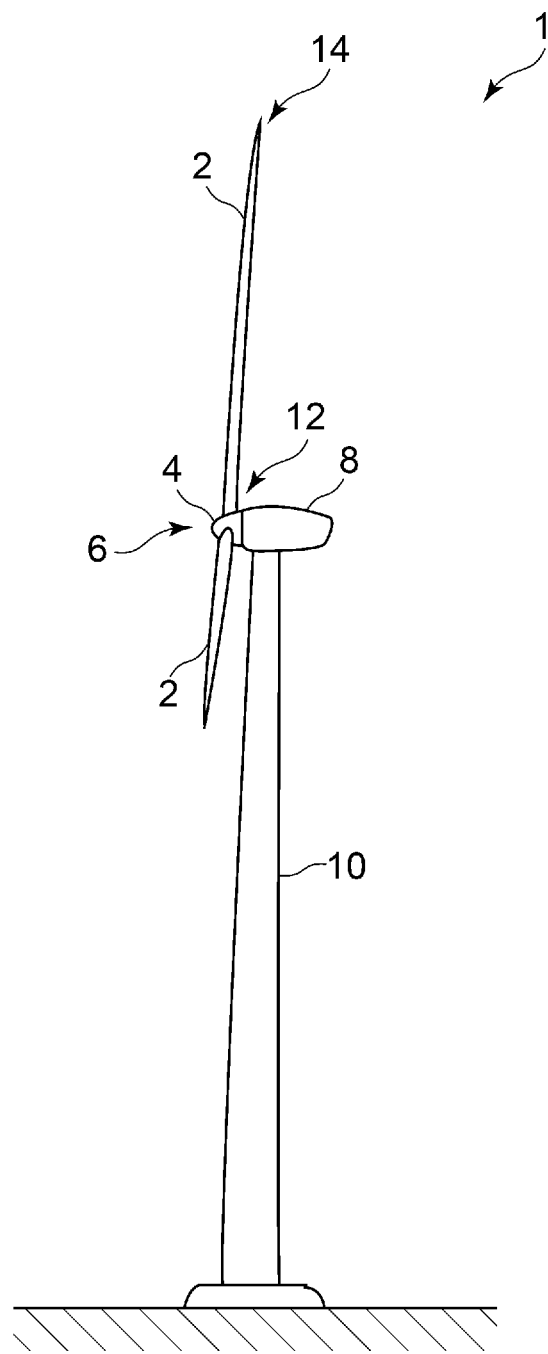
FIG. 1 is an overall configuration view schematically illustrating a windmill according to an embodiment.

Hereinafter, some embodiments of the present disclosure will be described with reference to the accompanying drawings. However, dimensions, materials, shapes, relative arrangements, or the like of components described in the embodiments or in the drawings are not intended to limit the scope of the present disclosure thereto, and are merely illustrative examples.

For example, an expression of relative or absolute arrangement such as "in a direction", "along a direction", "parallel", "orthogonal", "centered", "concentric" or "coaxial" shall not be construed as indicating only the arrangement in a strict literal sense, but also includes a state where the arrangement is relatively displaced by a tolerance, or by an angle or a distance within a range where the same function can be achieved.

For example, an expression of an equal state such as "same", "equal", "uniform" or the like shall not be construed as indicating only the state in which the feature is strictly equal, but also includes a state in which there is a tolerance or a difference within a range where the same function can be achieved.

Further, for example, an expression of a shape such as a rectangular shape, a cylindrical shape or the like shall not be construed as only the geometrically strict shape, but also includes a shape with unevenness, chamfered corners or the like within a range where the same effect can be achieved.

On the other hand, an expression such as "provide", "comprise", "contain", "include", or "have" are not intended to be exclusive of other components.

First, a configuration of a windmill 1 according to at least one embodiment of the present disclosure will be described. FIG. 1 is an overall configuration diagram schematically illustrating the windmill 1 according to an embodiment.

The windmill 1 includes at least one windmill blade 2. The windmill blade 2 is attached to a hub 4, so that the windmill blade 2 and the hub 4 constitute a windmill rotor 6 that is rotatable about a rotor shaft. In the windmill rotor 6 of the windmill 1 illustrated in FIG. 1, three windmill blades 2 are attached to the hub 4 at equal intervals around the rotor shaft. Each windmill blade 2 includes a blade root 12 connected to the hub 4 and a blade tip 14 located opposite to the blade root 12 in the blade longitudinal direction. The windmill rotor 6 is rotatably attached to a nacelle 8 that is pivotally provided on a tower 10. In the windmill 1 having such a configuration, when wind hits the windmill blades 2, the windmill rotor 6 including the windmill blades 2 and the hub 4 rotates around the rotor shaft.

The windmill 1 may be configured as a wind power generation device, for example. In this case, the nacelle 8 houses a power generator and a power transmission mechanism for transmitting rotation of the windmill rotor 6 to the power generator. In the windmill 1, rotational energy transmitted from the windmill rotor 6 to the power generator by the power transmission mechanism is converted into electrical energy by the power generator.

Figure 2:
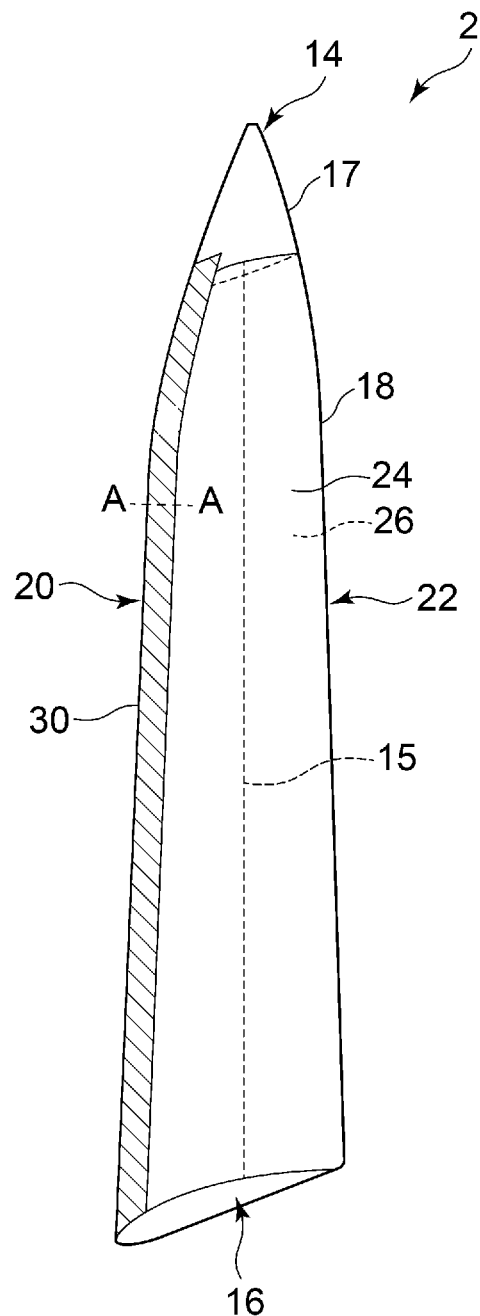
FIG. 2 is a schematic view illustrating a blade tip side of a windmill blade according to an embodiment.
Figure 3:
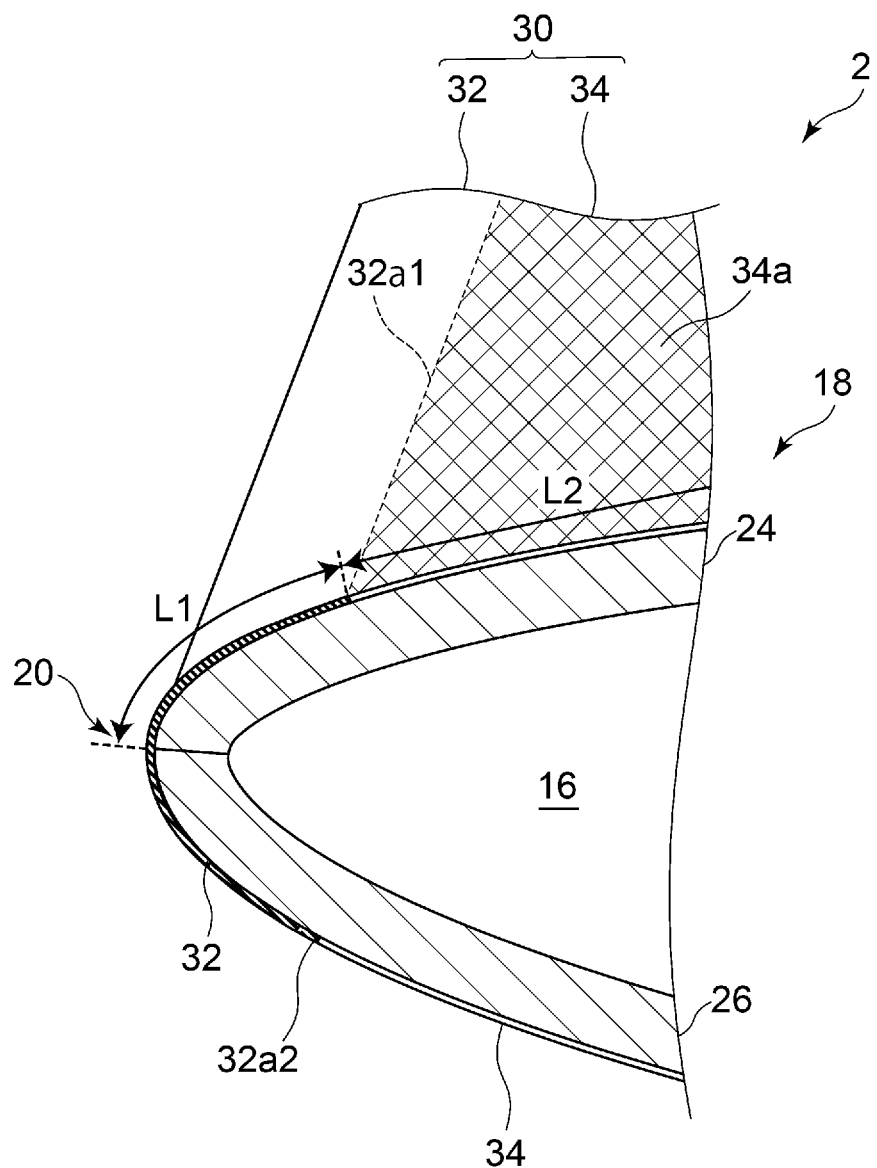
FIG. 3 is a perspective view of the vicinity of a leading edge including the cross section taken along a line A-A in FIG. 2 according to an embodiment.

FIG. 2 is a schematic view illustrating the side of the blade tip 14 of the windmill blade 2 according to an embodiment, and FIG. 3 is a perspective view of the vicinity of a leading edge 20 including the cross section taken along a line A-A in FIG. 2 according to the embodiment.

The windmill blade 2 includes a blade main body 18. The blade main body 18 extends from the blade root 12 (see FIG. 1) toward the blade tip 14 along the blade longitudinal direction, and includes the leading edge 20 provided on a leading side in the blade chord direction and a trailing edge 22 provided on a trailing side in the blade chord direction.

The blade main body 18 includes a skin containing fiber-reinforced plastic. As the fiber reinforced plastic constituting the skin, for example, glass fiber reinforced plastics (GFRP) and carbon fiber reinforced plastics (CFRP) can be used.

In the present embodiment, the blade main body 18 includes a suction-side skin 24 and a pressure-side skin 26 that are disposed so as to face each other. The suction-side skin 24 and the pressure-side skin 26 are connected to each other at the leading edge 20 and the trailing edge 22 of the blade main body 18, whereby a hollow space 16 surrounded by the skins is formed inside the blade main body 18.

Note that in the leading edge 20 and the trailing edge 22, the suction-side skin 24 and the pressure-side skin 26 are fixed to each other by being bonded, for example, by using an adhesive or the like.

A down conductor 15 is disposed in the hollow space 16. The down conductor 15 is configured to include a conductive material, and forms at least a portion of an electrical path through which a lightning current generated in the windmill blade 2 flows when the windmill 1 is struck by lightning. The down conductor 15 extends from a tip receptor 17 provided on the blade tip 14 along the blade longitudinal direction inside the hollow space 16, and is electrically connected to a grounding wire (not illustrated) provided on the blade root 12 side.

The windmill blade 2 includes a leading edge protector 30. The leading edge protector 30 is provided so as to cover the leading edge 20, thereby protecting the leading edge 20 from raindrops, dust, or the like during operation of the windmill 1 and protecting the blade main body 18 from erosion damage. As illustrated in FIG. 3, the leading edge protector 30 includes a conductive plate 32 and a conductive mesh member 34. Because the peripheral speed of the windmill blade 2 increases toward the outer side in the blade longitudinal direction, readily causing erosion damage, the leading edge protector 30 is provided over a predetermined range of the leading edge 20 on the side of the blade tip 14.

The conductive plate 32 covers the leading edge 20 of the blade main body 18 and has a curved shape along the leading edge 20 so as to conform to the shape of the leading edge 20. Such a conductive plate 32 is configured as a plate-shaped member that includes a material such as a metal having conductivity and excellent erosion resistance and has a predetermined thickness. The conductive plate 32 has superior wear resistance to the conductive mesh member 34, and thus the conductive plate 32 disposed to cover the leading edge 20 can effectively reduce erosion damage. In addition, the conductive plate 32 includes the conductive material, and forms a portion of a transmission path for the lightning current generated when the windmill blades 2 is struck by lightning during operation of the windmill 1, contributing to an improvement in lightning resistance performance of the windmill blade 2.

The conductive mesh member 34 is a mesh-like member having a plurality of holes 34a in the conductive material. The plurality of holes 34a formed in the conductive mesh member 34 open in the thickness direction of the suction-side skin 24 and the pressure-side skin 26 that constitute the blade main body 18. As described below, the suction-side skin 24 and the pressure-side skin 26, which constitute the blade main body 18, or an adhesive for bonding the leading edge protector 30 to the skin at least partially enters the holes 34a, thereby fixing the conductive mesh member 34 to the blade main body 18.

The conductive mesh member 34 having such a configuration is connected to the conductive plate 32 along the blade chord direction. Specifically, the conductive mesh member 34 is connected to extend from each of two trailing edge-side end portions 32a1 and 32a2 of the conductive plate 32 curved along the leading edge 20 toward the trailing edge along outer surfaces of the suction-side skin 24 and the pressure-side skin 26 that constitute the blade main body 18.

In addition, the conductive mesh member 34 includes the conductive material, and together with the above-mentioned conductive plate 32, forms the transmission path for the lightning current generated when the windmill blades 2 is struck by lightning during operation of the windmill 1, contributing to an improvement in lightning resistance performance of the windmill blades 2.

Note that the conductive material constituting the conductive plate 32 may be the same as or different from the conductive material constituting the conductive mesh member 34. Metal materials such as aluminum, iron, copper, stainless steel, or the like, having excellent erosion resistance performance and electrical conductivity can be used as the conductive materials. Note that in the leading edge protector 30, the conductive plate 32 and the conductive mesh member 34 may be integrally or separately formed.

In this way, the leading edge protector 30 contains the conductive material that is different from the material for the skin made of fiber reinforced plastic. Conventional leading edge protector is bonded on a skin by, for example, an adhesive, but sufficient connection strength may not be obtained using the adhesive when different materials are connected. The adhesive may also decrease in strength when exposed to moisture such as raindrops.

In the windmill blade 2 of the present embodiment, the fiber reinforced plastic that constitutes the suction-side skin 24 or the pressure-side skin 26, or the adhesive for bonding the leading edge protector 30 to the suction-side skin 24 or the pressure-side skin 26 at least partially enters the plurality of holes 34a in the conductive mesh member 34 that constitutes the leading edge protector 30, thereby fixing the leading edge protector 30 to the suction-side skin 24 or the pressure-side skin 26. That is, at least a portion of the conductive mesh member 34 is embedded in the fiber reinforced plastic constituting the suction-side skin 24 or the pressure-side skin 26 or in the adhesive. From a micro perspective, the plurality of holes 34a formed in the conductive mesh member 34 increases the area where the skin material and the adhesive are in contact with the leading edge protector 30, thereby increasing the attachment strength. In addition, from a macro perspective, the skin material and the adhesive are easily caught in the plurality of holes 34a formed in the conductive mesh member 34, thereby increasing the attachment strength.

Note that, for example, in the windmill blade 2 having a blade length of 50 m or more, as illustrated in FIG. 3, a length L1 of the conductive plate 32 along the skin surface from the top of the leading edge 20 is preferably in the range of 5 to 200 mm, and a length L2 of the conductive mesh member 34 along the skin surface from the boundary with the conductive plate 32 is preferably 10 mm or more.

Figure 4:
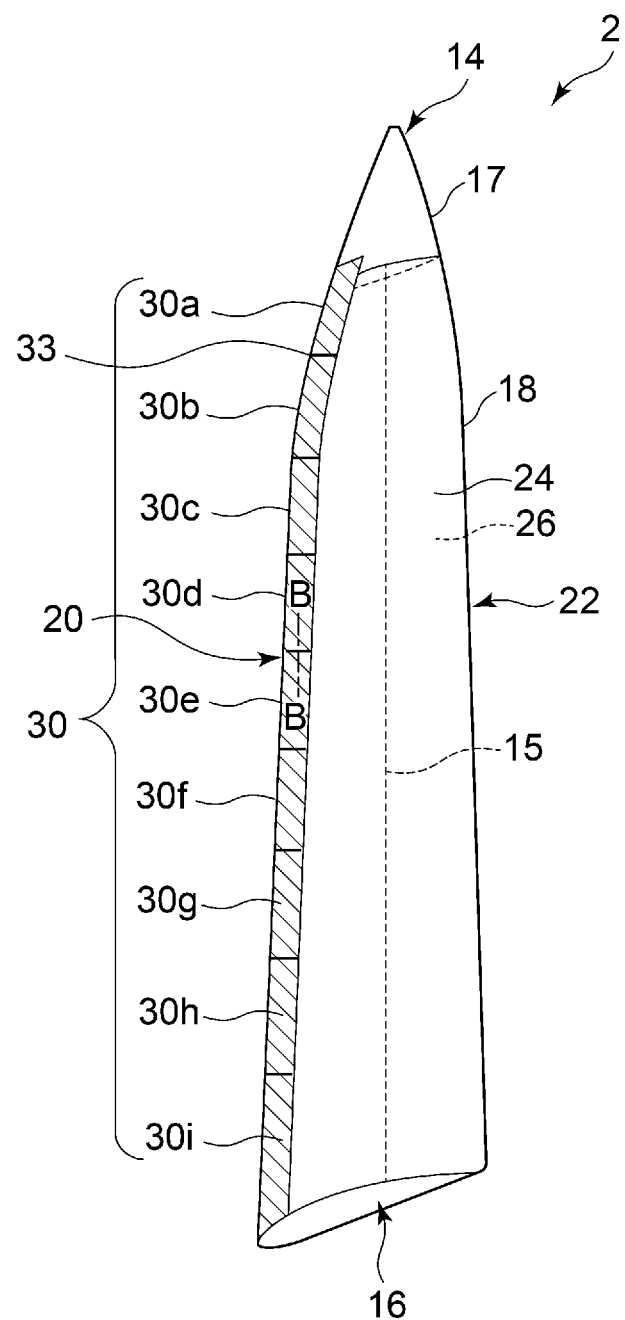
FIG. 4 is a schematic view illustrating a blade tip side of a windmill blade according to another embodiment.
Figure 5A:
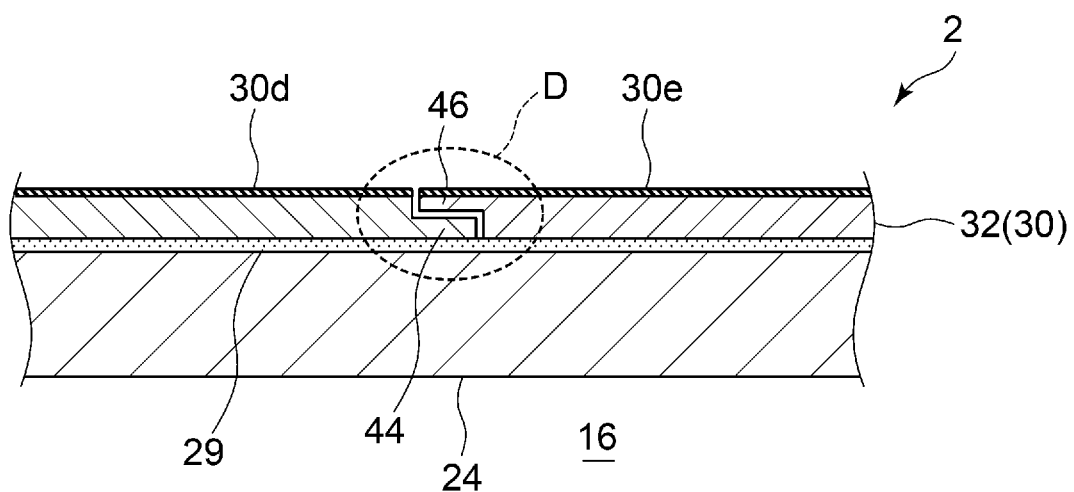
FIG. 5A is a cross-sectional view taken along a line B-B in FIG. 4 according to an embodiment.
Figure 5B:
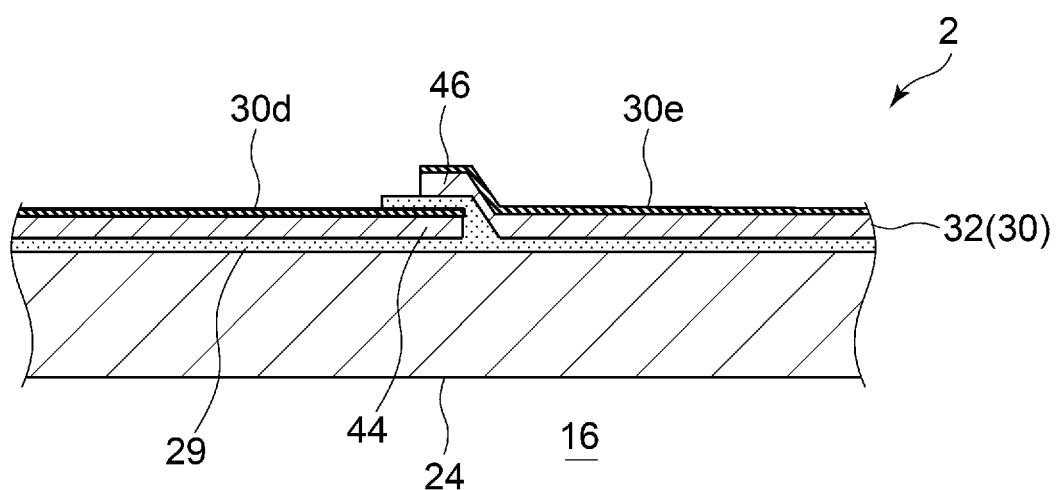
FIG. 5B is a cross-sectional view taken along the line B-B in FIG. 4 according to another embodiment.
Figure 5C:
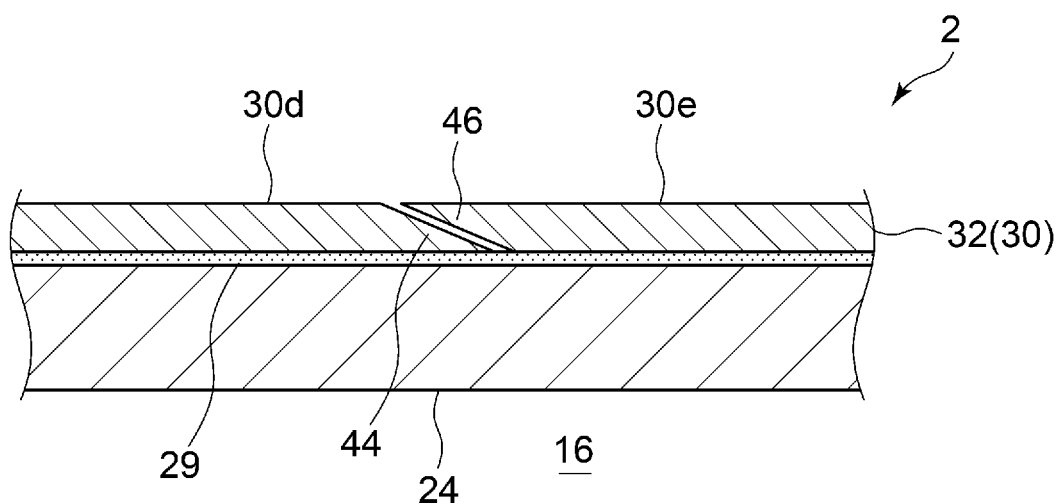
FIG. 5C is a cross-sectional view taken along the line B-B in FIG. 4 according to another embodiment.
Figure 6:
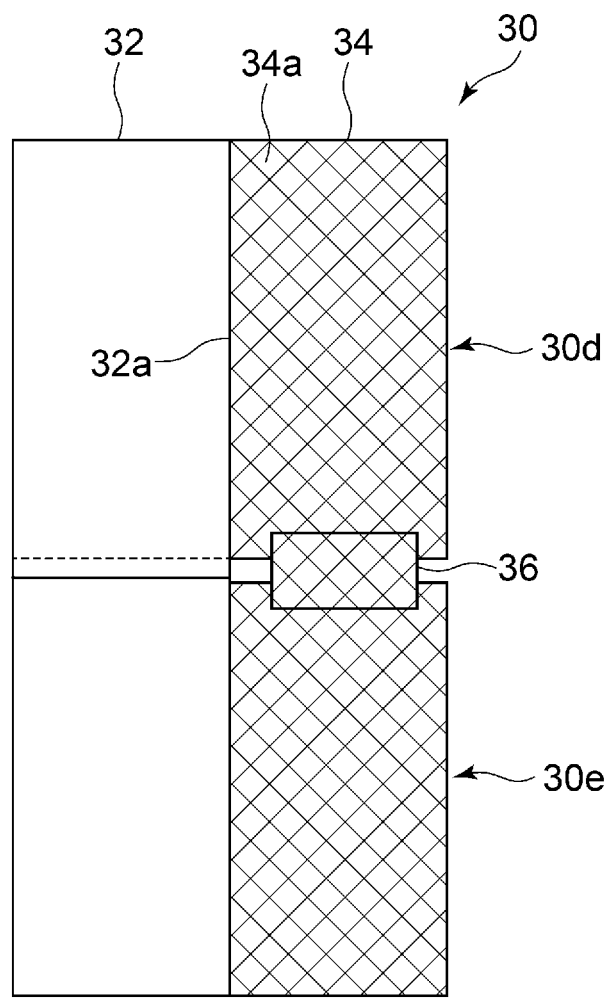
FIG. 6 is a plan view illustrating a leading edge protector in FIG. 4 when viewed from above.

FIG. 4 is a schematic view illustrating the side of the blade tip 14 of the windmill blade 2 according to another embodiment. FIGS. 5A to 5C are cross-sectional views taken along a line B-B in FIG. 4 according to some embodiments. FIG. 6 is a plan view illustrating the leading edge protector 30 in FIG. 4 when viewed from above (the near side in FIG. 4). As illustrated in FIG. 4, the leading edge protector 30 may be configured by disposing a plurality of protector members 30a, 30b, 30c, . . . each having the conductive plate 32 and the conductive mesh member 34 along the blade longitudinal direction of the blade main body 18. In recent years, with an increase in size of the windmill 1, for example, the blade length of the windmill blades 2 may have a few tens of meters, and it may not be practical to achieve the configuration described above with the single leading edge protector 30. Even in such a case, the configuration in which the plurality of protector members 30a, 30b, 30c, . . . constitute the leading edge protector 30 can protect the leading edge 20 against erosion damage over a wide range.

In the embodiment in FIG. 4, a boundary line 33 of two adjacent protector members of the adjacent protector members 30a, 30b, 30c, . . . is substantially parallel to the blade chord direction.

Each of the protector members 30a, 30b, 30c, . . . constituting the leading edge protector 30 includes the above-mentioned conductive plate 32 and conductive mesh member 34. As illustrated in FIGS. 5A to 5C, these protector members 30a, 30b, 30c, . . . are disposed such that a pair of end portions 44 and 46 of the conductive plates 32 of two adjacent protector members overlap each other. This can absorb a strain that can be generated in the leading edge protector 30 by deformation and thermal expansion of the windmill blades 2 during operation of the windmill 1, and a gap generated between the two adjacent protector members, thereby preventing erosion damage.

Further, as illustrated in FIGS. 5A to 5C, the pair of end portions 44 and 46 may have complementary shapes. For example, as illustrated in FIG. 5A, the end portion 44 of the protector member 30d has a cross-sectional shape in which the upper layer portion is cut so as to partially decrease in thickness, and the end portion 46 of the protector member 30e has a cross-sectional shape in which the lower layer portion is cut so as to partially decrease in thickness. Thus, the ends complement each other in shape. In addition, as illustrated in FIG. 5B, the end portion 46 of the protector member 30e is configured to cover the upper layer of the end portion 44 of the protector member 30d. In addition, as illustrated in FIG. 5C, the end portion 44 of the protector member 30d is flat on the lower layer side and tapered down to a tip in thickness, and the end portion 46 of the protector member 30e is flat on the upper layer side and tapered down to a tip in thickness. Thus, the end portions complement each other in shape.

Note that the shapes of the pair of end portions 44 and 46 illustrated in FIGS. 5A to 5C are mere examples and may be other shapes.

Each of the protector members is fixed to the skin constituting the blade main body 18 via a bonding layer 29. As illustrated in FIG. 5B, the bonding layer 29 may be configured to enter between the pair of end portions 44 and 46. Alternatively, as illustrated in FIGS. 5A and 5C, the bonding layer 29 may be configured so as not to enter between the pair of end portions 44 and 46 (in this case, the pair of end portions 44 and 46 are in direct contact with each other).

As illustrated in FIG. 6, the conductive mesh members 34 of adjacent two protector members of the plurality of protector members 30a, 30b, 30c, . . . may be electrically connected to each other via a conductive member 36. The conductive member 36 is, for example, a member made of a conductive material molded into a mesh shape similar to that of the conductive mesh member 34. The protector members 30a, 30b, 30c, . . . that constitute the leading edge protector 30 are electrically connected to each other via the conductive members 36 in this manner. Thus, an electrical resistance value of the leading edge protector 30 can be made small, achieving good lightning resistance performance.

Figure 7:
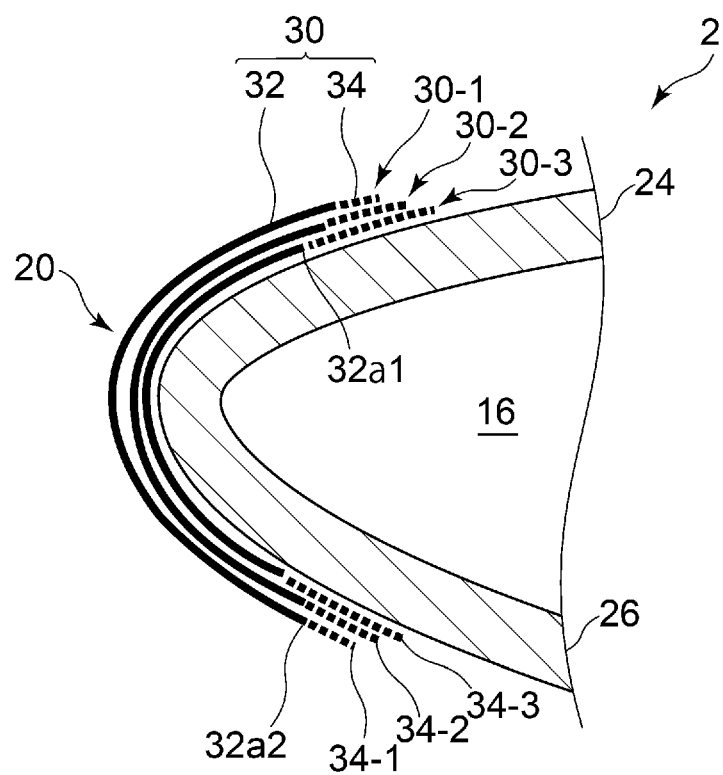
FIG. 7 is a cross-sectional view taken along the line A-A in FIG. 2 according to another embodiment.

FIG. 7 is a cross-sectional view taken along the line A-A in FIG. 2 according to another embodiment. As illustrated in FIG. 7, the plurality of leading edge protectors 30 having the configuration described above may be stacked on the leading edge 20. In this example, the leading edge protector 30 has a three-layered structure in which a first leading edge protector 30-1, a second leading edge protector 30-2 and a third leading edge protector 30-3 are stacked. The first leading edge protector 30-1, the second leading edge protector 30-2, and the third leading edge protector 30-3 in respective layers have the same configuration as the leading edge protector 30 described above. The plurality of leading edge protectors 30 stacked in this manner have more excellent erosion resistance performance than the single leading edge protector 30.

Note that in FIG. 7, for clarifying the configuration, the first leading edge protector 30-1, the second leading edge protector 30-2, and the third leading edge protector 30-3 are separate from each other, but the protectors may be disposed in direct contact with each other.

In this case, the plurality of leading edge protectors 30 may be stacked so that the respective conductive plates 32 overlap each other. Because the conductive plates 32 can suppress erosion damage more effectively than the conductive mesh members 34 having the holes 34a, stacking the conductive plates 32 of the leading edge protectors 30 can improve the erosion resistance performance more effectively. In addition, the conductive plate 32 having a predetermined thickness can be prevented from being melted due to a temperature increase at a time of lightning strike, but processability decreases as the thickness increases. Thus, stacking the plurality of relatively thin conductive plates 32 in this manner makes it possible to obtain the required thickness and also achieve processability.

As also illustrated in FIG. 7, the first leading edge protector 30-1, the second leading edge protector 30-2, and the third leading edge protector 30-3 may be stacked so that trailing edge-side end portions 34-1, 34-2, and 34-3 of the conductive mesh members 34 are located at different positions. During operation of the windmill 1, stress tends to concentrate on the trailing edge-side end portions of the conductive mesh members 34. However, locating the trailing edge-side end portions of the conductive mesh members 34 of the leading edge protectors 30 at different positions can disperse such stress and effectively suppress the leading edge protector 30 from falling off from the skin.

Note that FIG. 7 illustrates a case in which, in the first leading edge protector 30-1, the second leading edge protector 30-2, and the third leading edge protector 30-3, the trailing edge-side end portion of the conductive mesh member 34 of the leading edge protector 30 on the upper layer side is located closer to the leading edge. However, the trailing edge-side end portion on the upper layer side may be located closer to the trailing edge of the windmill blade 2, or the trailing edge-side end portions of the first leading edge protector 30-1, the second leading edge protector 30-2, and the third leading edge protector 30-3 may be randomly arranged.

Figure 8:
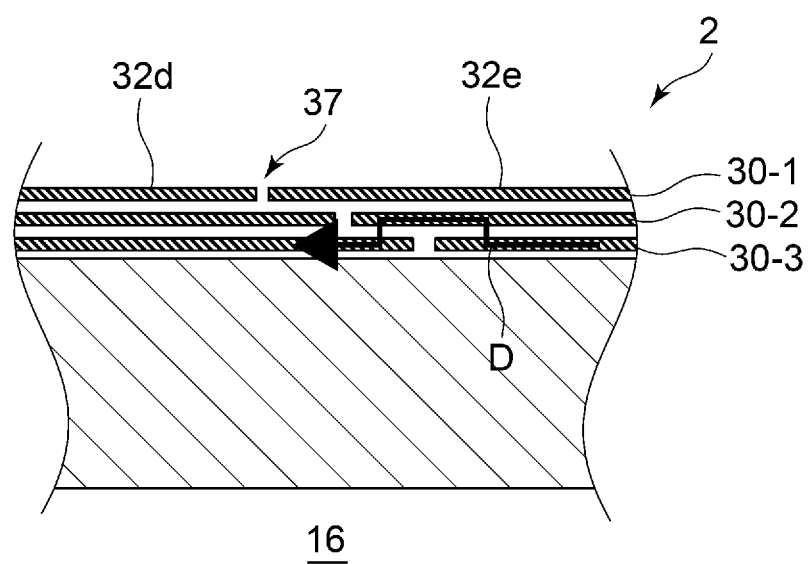
FIG. 8 is a cross-sectional view illustrating a conductive plate in FIG. 7 along a blade longitudinal direction.

The plurality of leading edge protectors 30 stacked in this manner may have the cross-sectional structure illustrated in FIG. 8. FIG. 8 is a cross-sectional view of the conductive plates 32 in FIG. 7 along the blade longitudinal direction. In this embodiment, the layers (the first leading edge protector 30-1, the second leading edge protector 30-2, and the third leading edge protector 30-3) are stacked so that gaps 37 between conductive plates 32d and 32e of two adjacent protector members 30d and 30e of the plurality of protector members 30a, 30b, 30c, . . . disposed in the blade longitudinal direction are located at different positions in the respective layers. As a result, as illustrated by an arrow D in FIG. 8, a conductive path along the blade longitudinal direction is efficiently formed via the conductive plate 32 belonging to another adjacent layer, thereby acquiring good lightning resistance performance.

Figure 9:
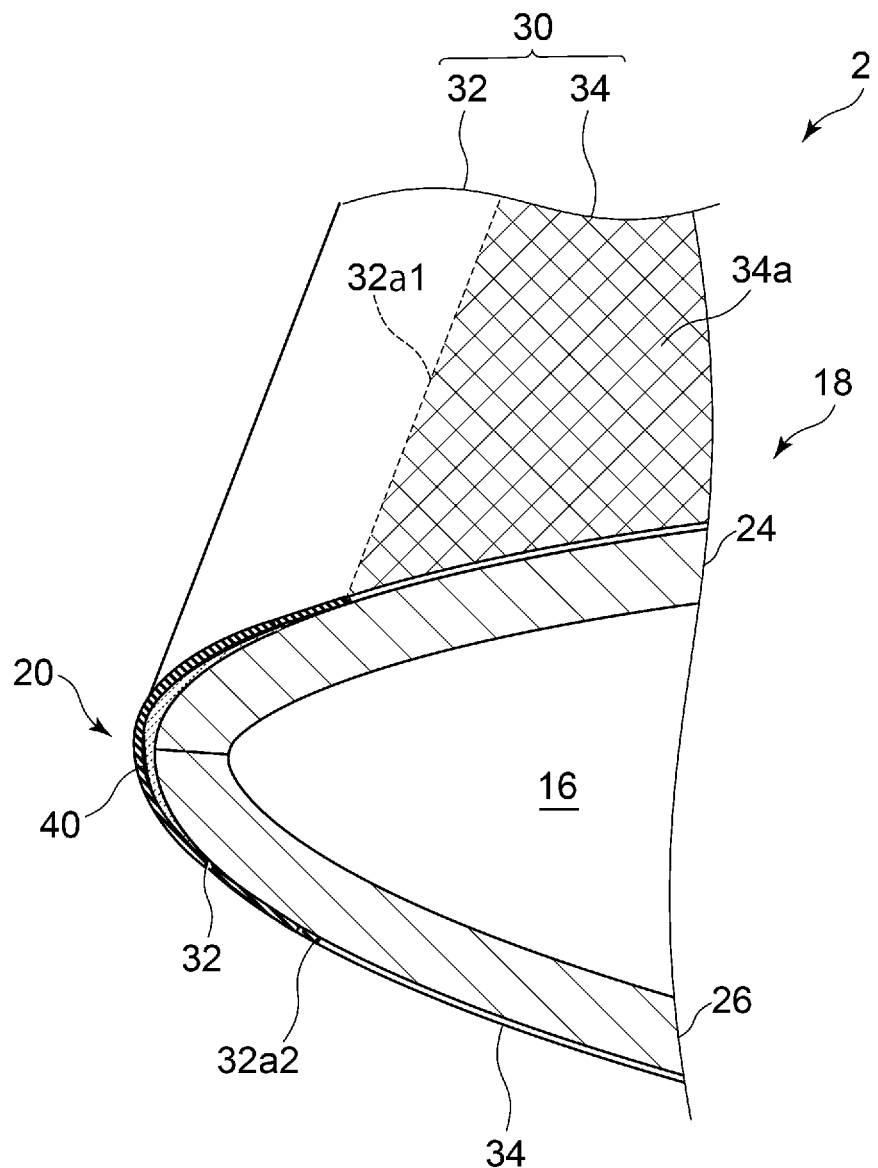
FIG. 9 is a perspective view illustrating the vicinity of a leading edge including the cross section taken along the line A-A in FIG. 2 according to another embodiment.

FIG. 9 is a perspective view of the vicinity of the leading edge including the cross section taken along the line A-A in FIG. 2 according to another embodiment. In the embodiment illustrated in FIG. 9, a shock-absorbing member 40 is further provided, which is disposed between the leading edge 20 and the leading edge protector 30. The shock-absorbing member 40 is interposed between the leading edge 20 and the leading edge protector 30, and is made of a soft material such as an elastomer or a resin. The shock absorbing member can absorb a shock generated when raindrops, dust, or the like collides with the leading edge protector 30 covering the leading edge 20, thereby suppressing damage to the leading edge protector 30, which makes it possible to configure the leading edge protector 30 having a longer service life. Further, strain generated in the leading edge protector 30 during operation of the windmill 1 can be alleviated, thereby configuring the leading edge protector 30 having a higher strength.

Figure 10:
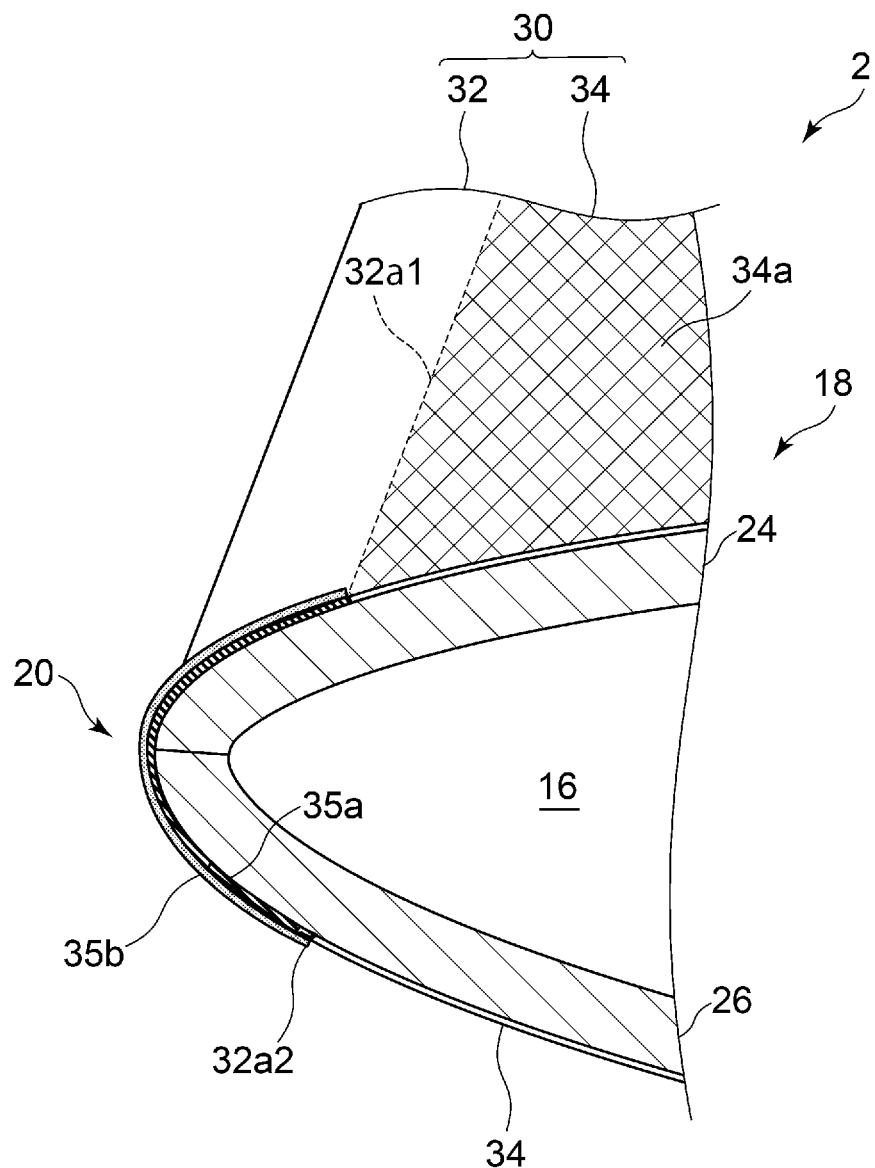
FIG. 10 is a perspective view illustrating the vicinity of a leading edge including the cross section taken along the line A-A in FIG. 2 according to another embodiment.

FIG. 10 is a perspective view of the vicinity of the leading edge including the cross section taken along the line A-A in FIG. 2 according to another embodiment. In the embodiment illustrated in FIG. 10, the conductive plate 32 that constitutes the leading edge protector 30 has a hybrid structure including a first layer 35a and a second layer 35b that at least partially covers an externally-facing outer surface of the first layer 35a.

The second layer 35b may contain a harder material than the first layer 35a. In this case, the second layer 35b located on the externally-facing side contains the harder material than the first layer 35a located on the lower layer side and thus can protect the first layer 35a to obtain good erosion resistance performance. As a result, the material of the first layer 35a protected by the second layer 35b can be selected more flexibly.

In addition, the first layer 35a may contain a more excellent conductive material than the second layer 35b. In this case, good electrical conductivity is achieved using the first layer 35a while good erosion resistance performance is achieved using the second layer 35b, so that lightning resistance performance of the windmill blade 2 can be improved.

Note that the first layer 35a and the second layer 35b that constitute the leading edge protector 30 are joined using a general bonding method such as bonding rolling, welding using a laser, electron beam, or the like, or diffusion bonding.

Figure 11:
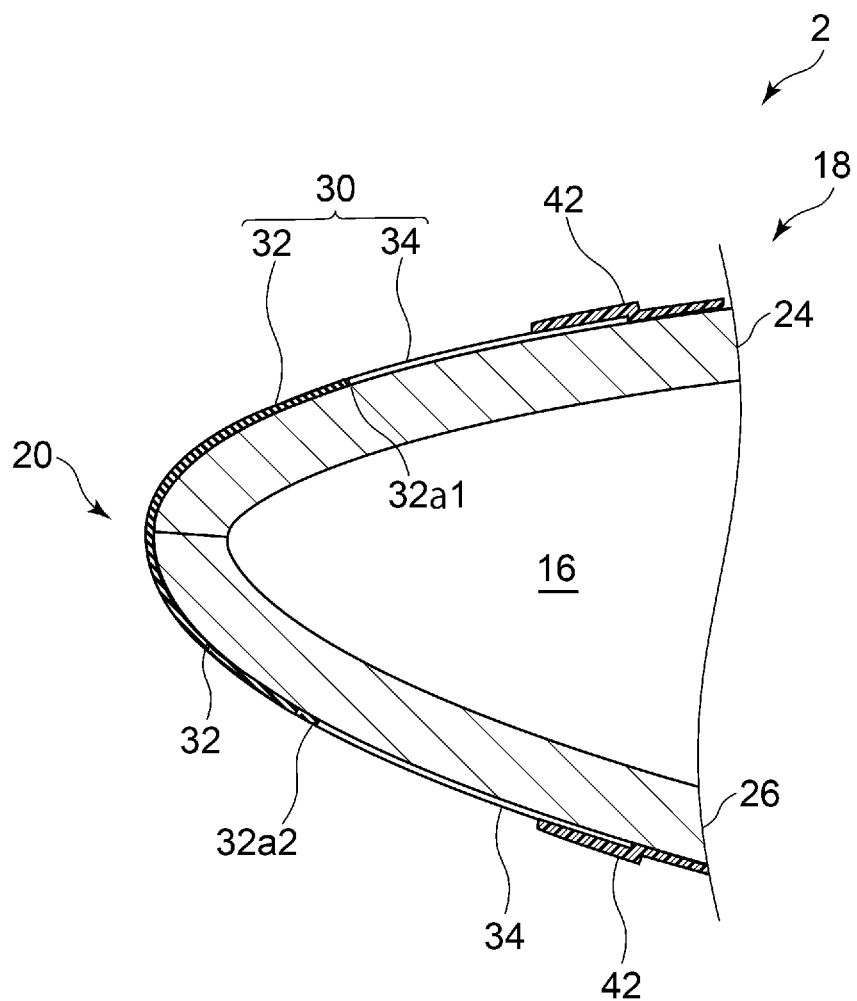
FIG. 11 is a cross-sectional view taken along the line A-A in FIG. 2 according to another embodiment.

FIG. 11 is a cross-sectional view taken along the line A-A in FIG. 2 according to another embodiment. In the embodiment illustrated in FIG. 11, the windmill blade 2 further includes a reinforcing member 42 fixed to the skin so as to cover the trailing edge-side end portion of the conductive mesh member 34. The reinforcing member 42 is formed, for example, from the same material (fiber reinforced plastic) as the skin that constitutes the blade main body 18. As a result, the conductive mesh member 34 is fixed by the reinforcing member 42 from the upper layer side, and by the suction-side skin 24 or the pressure-side skin 26 that constitutes the blade main body 18 from the lower layer side. Because the reinforcing member 42, the suction-side skin 24, and the pressure-side skin 26 are all made of fiber reinforced plastic, and at least partially enter the plurality of holes 34a of the conductive mesh member 34, the conductive mesh member 34 can be more firmly fixed to the blade main body 18, so that the more reliable windmill blade 2 can be obtained in which the leading edge protector 30 hardly falls off.

As described above, in the windmill blade 2 according to each of the embodiments described above, the skin or the adhesive can enter the plurality of holes 34a formed in the conductive mesh member 34 of the leading edge protector 30, thereby fixing the leading edge protector 30 to the skin with high reliability while achieving good lightning resistance performance.

Figure 12:
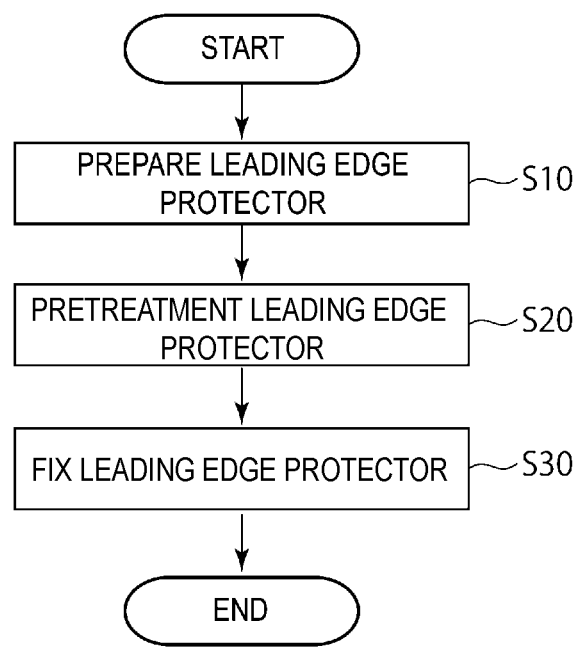
FIG. 12 is a flowchart illustrating each step of a method of manufacturing a windmill blade 2 according to an embodiment.

Next, a method of manufacturing the windmill blade 2 having the above-mentioned configuration will be described. FIG. 12 is a flowchart illustrating each step of a method of manufacturing the windmill blade 2 according to an embodiment.

First, the leading edge protector 30 to be attached to the blade main body 18 is prepared (Step S10). As described above, the leading edge protector 30 is configured so that the conductive mesh member 34 including the plurality of holes 34a is connected to the end portion of the conductive plate 32 having a shape corresponding to the leading edge 20 of the blade main body 18.

Figure 13:
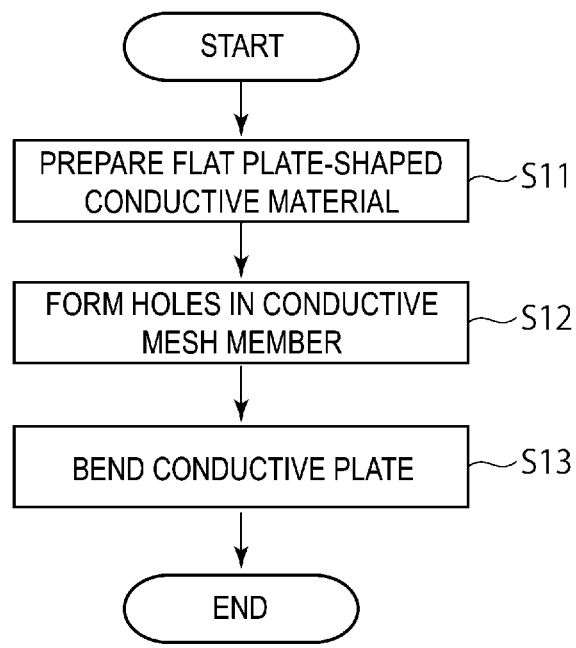
FIG. 13 is a flowchart illustrating an embodiment of Step S10 in FIG. 12.

FIG. 13 is a flowchart illustrating an embodiment of Step S10 in FIG. 12. In the embodiment of Step S10, first, a flat plate-shaped conductive material is prepared as a material for forming the leading edge protector 30 (Step S11). Of the conductive material, respective areas to be shaped into the conductive plate 32 and the conductive mesh member 34 that constitute the leading edge protector 30 are defined, and the plurality of holes 34a are formed in the area corresponding to the conductive mesh member 34 of the conductive material (Step S12). The plurality of holes 34a in Step S12 are formed by punching, for example. Next, the area corresponding to the conductive plate 32 in the flat plate-shaped material is bent to conform to the leading edge 20 (Step S13). The bending of Step S13 is performed by pressing, for example. In this way, the leading edge protector 30 to be attached to the blade main body 18 is created.

Note that when the conductive mesh member 34 is formed to be thinner than the conductive plate 32, the area corresponding to the conductive mesh member 34 in the conductive material may be cut as necessary.

Figure 14:
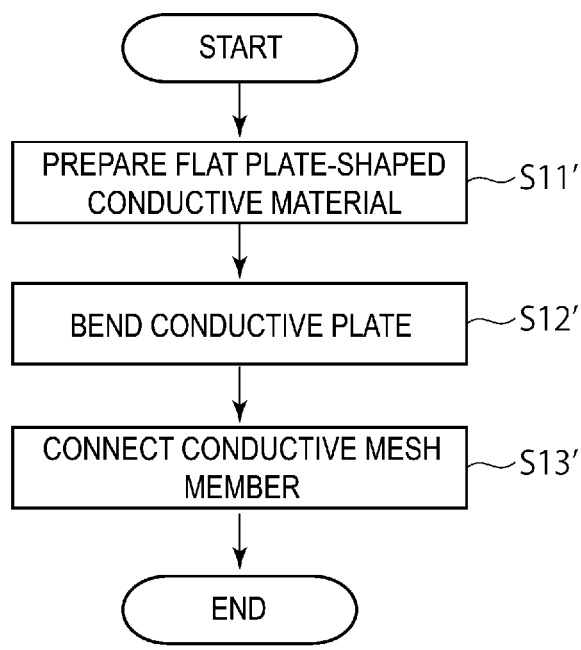
FIG. 14 is a flowchart illustrating another embodiment of Step S10 in FIG. 12.

FIG. 14 is a flowchart illustrating another embodiment of Step S10 in FIG. 12. In this embodiment of Step S10, first, a flat plate-shaped conductive material is first prepared as a material for forming the conductive plate 32 of the leading edge protector 30 (Step S11'), and bent to conform to the leading edge 20 (Step S12'). The bending in Step S12' is performed by pressing, for example. Next, the conductive mesh member 34 including the plurality of holes 34a is connected to the trailing edge-side end portion of the bent conductive plate 32 (Step S13'). The conductive mesh member 34 is created in advance by for example punching the plurality of holes 34a in the flat plate-shaped conductive material.

In the embodiment in FIG. 14, the conductive plate 32 may be formed by bending the conductive material after the conductive mesh member 34 is connected to the flat plate-shaped conductive material.

Returning to FIG. 12, a pretreatment is performed on the leading edge protector 30 prepared in Step S10 (Step S20). Examples of this pretreatment can include sanding, etching, laser processing, plasma processing, and plating. The sanding can form appropriate irregularities on the attachment surface of the leading edge protector 30. The etching can remove dirt from the attachment surface of the leading edge protector 30 and form finer irregularities than the sanding. The laser processing can remove dirt from the attachment surface of the leading edge protector 30, and form an oxidized layer on the clean surface from which the dirt has been removed. The plasma processing can remove dirt from the attachment surface of the leading edge protector 30, and activates the surface. The plating can apply a plating layer to the attachment surface of the leading edge protector 30 to facilitate adhesion to the blade main body 18.

Subsequently, the leading edge protector 30 is fixed to the blade main body 18 (Step S30). The fixing of the leading edge protector 30 in Step S30 is performed so that the skin constituting the blade main body 18 or the adhesive for bonding the leading edge protector 30 to the skin at least partially enters the plurality of holes 34a formed in the conductive mesh member 34 of the leading edge protector 30.

For example, the fixation of the leading edge protector 30 in Step S30 may be done simultaneously with the molding of the blade main body 18. Specifically, for example, a mold corresponding to the suction-side skin 24 and the pressure-side skin 26 that constitute the blade main body 18 is prepared, and the leading edge protector 30 is disposed on the mold. Then, a fiber material (glass fiber material in the case where the skin is GFRP, and carbon fiber material in the case where the skin is CFRP) constituting the suction-side skin 24 and the pressure-side skin 26 is staked in the mold in which the leading edge protector 30 is disposed. Then, a liquid resin is injected, and the fiber material and the leading edge protector 30 are impregnated with the liquid resin. At this time, the impregnation is performed so that the liquid resin enters the plurality of holes 34a of the conductive mesh member 34 of the leading edge protector 30 disposed in the mold. Thereafter, the liquid resin is cured and the resultant product is removed from the mold, so that the windmill blade 2 is completed.

Note that, for example, vacuum assisted resin transfer molding (VaRTM method) can be used for molding the blade main body 18.

According to the above-mentioned manufacturing method, the skin or the adhesive at least partially enters the plurality of holes 34a formed in the conductive mesh member 34, thereby enabling manufacture of the windmill blade 2 in which the leading edge protector 30 including the conductive plate 32 and the conductive mesh member 34 is fixed to the blade main body 18.

In addition, it is possible to replace the components in the above-described embodiments with well-known components as appropriate without departing from the spirit of the present disclosure, and the above-described embodiments may be combined as appropriate.

The details described in each embodiment can be understood as follows, for example.

(1) A windmill blade according to an aspect (for example, the windmill blade 2 according to the above-mentioned embodiment) includes:

a blade main body (for example, the blade main body 18 according to the above-mentioned embodiment); and a leading edge protector (for example, the leading edge protector 30 according to the above-mentioned embodiment) including a conductive plate (for example, the conductive plate 32 according to the above-mentioned embodiment) and a conductive mesh member (for example, the conductive mesh member 34 according to the above-mentioned embodiment), the conductive plate covering a leading edge (the leading edge 20 according to the above-mentioned embodiment) of the blade main body, the conductive mesh member being connected to the conductive plate along a blade chord direction of the windmill blade and including a plurality of holes (for example, the plurality of holes 34*a* according to the above-mentioned embodiment) open in a thickness direction of a skin (for example, the suction-side skin 24 or the pressure-side skin 26 according to the above-mentioned embodiment) constituting the blade main body, and the skin or an adhesive used for bonding the leading edge protector to the skin at least partially enters the plurality of holes, so that the leading edge protector is fixed to the skin.

According to the above aspect (1), the skin or the adhesive can enter the plurality of holes provided in the conductive mesh member of the leading edge protector, thereby firmly fixing the leading edge protector to the leading edge of the blade main body. As a result, by providing the leading edge protector made of the conductive material on the leading edge, the windmill blade having good lightning resistance performance and erosion resistance performance can be achieved with a reliable configuration.

(2) According to another aspect, in the above aspect (1), the leading edge protector includes a plurality of protector members (for example, the protector members 30*a*, 30*b*, 30*c*, . . . according to the above-mentioned embodiment) disposed along a blade longitudinal direction of the blade main body, each of the plurality of protector members including the conductive plate and the conductive mesh member.

According to the above aspect (2), the leading edge protector includes the plurality of protector members each including the conductive plate and the conductive mesh member. Thus, even when the windmill blade is large, the leading edge can be protected against erosion damage over a wide range while good lightning resistance performance is achieved.

(3) According to another aspect, in the above aspect (2), the plurality of protector members are disposed so that a pair of end portions (for example, the pair of end portions 44 and 46 according to the above-mentioned embodiment) of the conductive plates of two adjacent protector members of the plurality of protector members overlap each other.

According to the above aspect (3), the plurality of protector members constituting the leading edge protector are disposed so that the conductive plates of the two adjacent protector members overlap each other. This can absorb a strain that can be generated in the leading edge protector by deformation and thermal expansion of the windmill blade and generate a gap between the two adjacent protector members, thereby preventing erosion damage.

(4) According to another aspect, in the above aspect (2) or (3), the conductive mesh members of two adjacent protector members of the plurality of protector members are electrically connected to each other via a conductive member (for example, the conductive member 36 according to the above-mentioned embodiment).

According to the above aspect (4), by electrically connecting the conductive mesh members of the protector members constituting the leading edge protector to each other via the conductive member, the electrical resistance value of the leading edge protector can be made small, effectively improving lightning resistance performance of the windmill blade.

(5) According to another aspect, in any one of the above aspects (1) to (4), a plurality of the leading edge protectors are stacked on the leading edge.

According to the above aspect (5), by stacking the plurality of leading edge protectors on the leading edge, more excellent erosion resistance performance can be obtained.

(6) According to another aspect, in the above aspect (5), the plurality of the leading edge protectors are stacked so that trailing edge-side end portions of the conductive mesh members are located at different positions.

According to the above aspect (6), by making the positions of the trailing edge-side end portions of the stacked leading edge protectors different from each other, a stress that tends to be applied to the trailing edge-side ends during operation of the windmill blade can be dispersed, effectively suppressing the leading edge protector from falling off from the skin.

(7) According to another aspect, in any one of the above aspects (1) to (6), a shock-absorbing member (for example, the shock-absorbing member 40 according to the above-mentioned embodiment) provided between the leading edge and the leading edge protector is further provided.

According to the above aspect (7), by disposing the shock-absorbing member between the leading edge and the conductive plate, it is possible to absorb shock generated when raindrops, dust, and the like, which cause erosion damage, hit against the leading edge protector. This can reduce wear of the leading edge protector and achieve a windmill blade having a longer service life.

(8) According to another aspect, in any one of the above aspects (1) to (7), the conductive plate includes:

a first layer (for example, the first layer 35*a* according to the above-mentioned embodiment); and a second layer (for example, the second layer 35*b* according to the above-mentioned embodiment) at least partially covering an externally-facing outer surface of the first layer, and the second layer contains a harder material than the first layer.

According to the above aspect (8), the second layer located on the externally-facing side of the conductive plate constituting the leading edge protector contains the harder material than the first layer located on the lower layer side and thus, can protect the first layer to achieve good erosion resistance performance. Thus, it is possible to more flexibly select the material of the first layer protected by the second layer.

(9) According to another aspect, in any one of the above aspects (1) to (8), the conductive plate includes:
a first layer (for example, the first layer 35a according to the above-mentioned embodiment); and
a second layer (for example, the second layer 35b according to the above-mentioned embodiment) at least partially covering an externally-facing outer surface of the first layer, and
the first layer contains a more excellent conductive material than the second layer.

According to the aspect (9), good electrical conductivity is achieved using the first layer while good erosion resistance performance is achieved using the second layer, so that lightning resistance performance of the windmill blade can be improved.

(10) According to another aspect, in any one of the above aspects (1) to (9), a reinforcing member (for example, the reinforcing member according to the above embodiment) fixed to the skin to cover a trailing edge-side end portion of the conductive mesh member is further provided.

According to the above aspect (10), the leading edge protector is fixed to the skin by covering the trailing edge-side end portion of the conductive mesh member with the reinforcing member. Thus, the leading edge protector can be more firmly fixed to the skin, thereby obtaining a more reliable windmill blade in which the leading edge protector hardly falls off.

(11) A windmill according to one aspect includes the windmill blade according to any one of the above (1) to (10).

According to the above aspect (11), by providing the windmill blade that can effectively suppress erosion damage while achieving excellent lightning resistance performance, a highly reliable windmill can be achieved with a low maintenance burden.

(12) A method of manufacturing a windmill blade according to an aspect includes:

preparing a leading edge protector including a conductive plate and a conductive mesh member, the conductive plate being shaped to conform to a leading edge of a blade main body, the conductive mesh member being connected to an end portion of the conductive plate and including a plurality of holes (for example, Step S10 according to the above-mentioned embodiment); and
fixing the leading edge protector to the blade main body so that a skin constituting the blade main body or an adhesive for bonding the leading edge protector to the skin at least partially enters the plurality of holes (for example, Step S20 according to the above-mentioned embodiment).

According to the above aspect (12), the skin or the adhesive at least partially enters the plurality of holes formed in the conductive mesh member, thereby enabling manufacture of the windmill blade in which the leading edge protector including the conductive plate and the conductive mesh member is fixed to the blade main body.

(13) According to another aspect, in the above aspect (12), the preparing of the leading edge protector includes:

forming the plurality of holes in an area corresponding to the conductive mesh member in a flat plate-shaped conductive material (for example, Step S11 according to the above-mentioned embodiment); and
bending an area corresponding to the conductive plate in the conductive material so that the area corresponding to the conductive plate conforms to the leading edge (for example, Step S12 according to the above-mentioned embodiment).

According to the above aspect (13), the leading edge protector to be attached to the leading edge is prepared by forming the plurality of holes in the area corresponding to the conductive mesh member in the flat plate-shaped conductive material and then, bending the area corresponding to the conductive plate.

(14) According to another aspect, in the above aspect (12), the preparing of the leading edge protector includes:

forming the conductive plate by bending a flat plate-shaped conductive material so that the flat plate-shaped conductive material conforms to the leading edge (for example, Step S11' according to the above-mentioned embodiment); and
connecting the conductive mesh member in which the plurality of holes are formed in an end portion of the conductive plate (for example, Step S12' according to the above-mentioned embodiment).

According to the above aspect (14), the leading edge protector to be attached to the leading edge is prepared by connecting the conductive mesh member to the conductive plate formed by bending the flat plate-shaped conductive material.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A windmill blade comprising:
a blade main body; and
a leading edge protector including
a conductive plate which covers a leading edge of the blade main body and extends from a first edge on an upper surface of the blade main body to a second edge on a lower surface of the blade main body, and
a conductive mesh member, wherein an edge of the conductive mesh member is connected to one of the first and second edges of the conductive plate, and the conductive mesh member extends away from the one of the first and second edges of the conductive plate along a blade chord direction of the windmill blade away from the leading edge and toward a trailing edge of the blade main body, the conductive mesh member including a plurality of holes open in a thickness direction of a skin constituting the blade main body, wherein
the skin or an adhesive used for bonding the leading edge protector to the skin at least partially enters the plurality of holes, so that the leading edge protector is fixed to the skin.

2. The windmill blade according to claim 1, wherein the leading edge protector is one of a plurality of protector members disposed along a blade longitudinal direction of the blade main body, each of the plurality of protector members including the conductive plate and the conductive mesh member.

3. The windmill blade according to claim 2, wherein the plurality of protector members are disposed so that opposing end portions of the conductive plates of two adjacent protector members of the plurality of protector members overlap each other.

4. The windmill blade according to claim 2, wherein the conductive mesh members of two adjacent protector members of the plurality of protector members are electrically connected to each other via a conductive member.

5. The windmill blade according to claim 1, wherein the leading edge protector is one of a plurality of leading edge protectors which are stacked on the leading edge.

6. The windmill blade according to claim 5, wherein the plurality of leading edge protectors are stacked so that respective trailing edge-side end portions of the conductive mesh members of the plurality of leading edge protectors are located at different positions.

7. The windmill blade according to claim 1, further comprising a shock-absorbing member provided between the leading edge and the leading edge protector.

8. The windmill blade according to claim 1, wherein the conductive plate includes:
   a first layer; and
   a second layer at least partially covering an externally-facing outer surface of the first layer,
   wherein the second layer contains a harder material than the first layer.

9. The windmill blade according to claim 1, wherein the conductive plate includes:
   a first layer; and
   a second layer at least partially covering an externally-facing outer surface of the first layer,
   wherein the first layer contains a more conductive material than the second layer.

10. The windmill blade according to claim 1, further comprising a reinforcing member fixed to the skin to cover a trailing edge-side end portion of the conductive mesh member.

11. A windmill comprising the windmill blade according to claim 1.

12. A method of manufacturing a windmill blade, the method comprising:
   preparing a leading edge protector including a conductive plate and a conductive mesh member, the conductive plate being shaped to conform to a leading edge of a blade main body, an edge of the conductive mesh member being connected to one of a first edge and a second edge of the conductive plate so as to extend away from the one of the first and second edges of the conductive plate along a blade chord direction away from the leading edge and toward a trailing edge of the blade main body, the conductive mesh member including a plurality of holes; and
   fixing the leading edge protector to the blade main body so that the conductive plate extends from the first edge on an upper surface of the blade main body to the second edge on a lower surface of the blade main body, and so that a skin constituting the blade main body or an adhesive for bonding the leading edge protector to the skin at least partially enters the plurality of holes of the conductive mesh member.

13. The method of manufacturing a windmill blade according to claim 12, wherein
   the preparing of the leading edge protector includes:
   forming the plurality of holes in an area corresponding to the conductive mesh member in a flat plate-shaped conductive material; and
   bending an area corresponding to the conductive plate in the conductive material so that the area corresponding to the conductive plate conforms to the leading edge.

14. The method of manufacturing a windmill blade according to claim 12, wherein
   the preparing of the leading edge protector includes:
   forming the conductive plate by bending a flat plate-shaped conductive material so that the flat plate-shaped conductive material conforms to the leading edge; and
   connecting the conductive mesh member in which the plurality of holes are formed to the one of the first and second edges of the conductive plate.

* * * * *